Aug. 27, 1940.  C. OLDER  2,212,615
CONCRETE ROAD JOINT
Filed Oct. 20, 1939  2 Sheets-Sheet 1
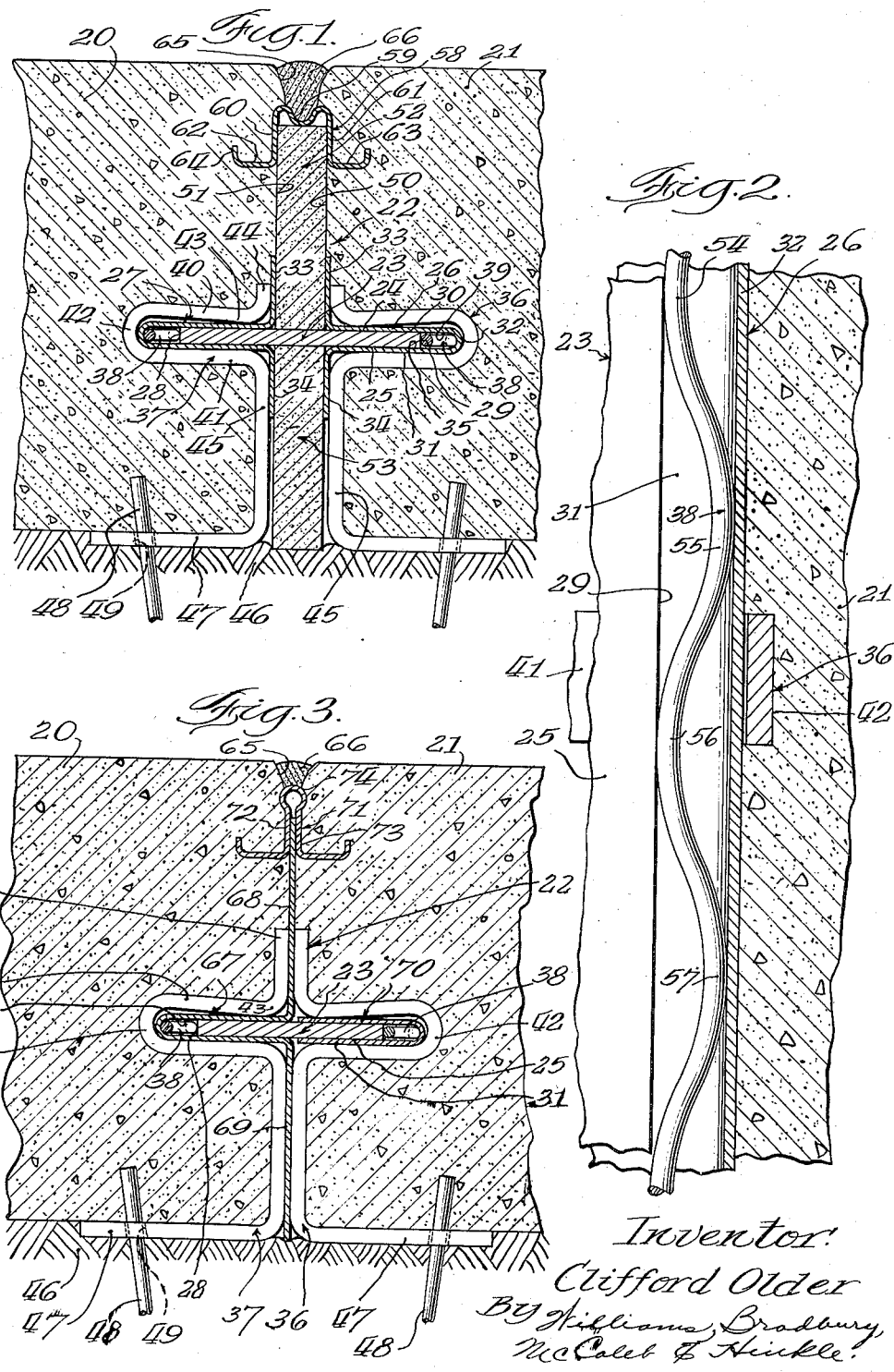
Inventor:
Clifford Older
By Williams, Bradbury,
McCaleb & Hinkle
Attys.

Aug. 27, 1940.    C. OLDER    2,212,615
CONCRETE ROAD JOINT
Filed Oct. 20, 1939    2 Sheets-Sheet 2
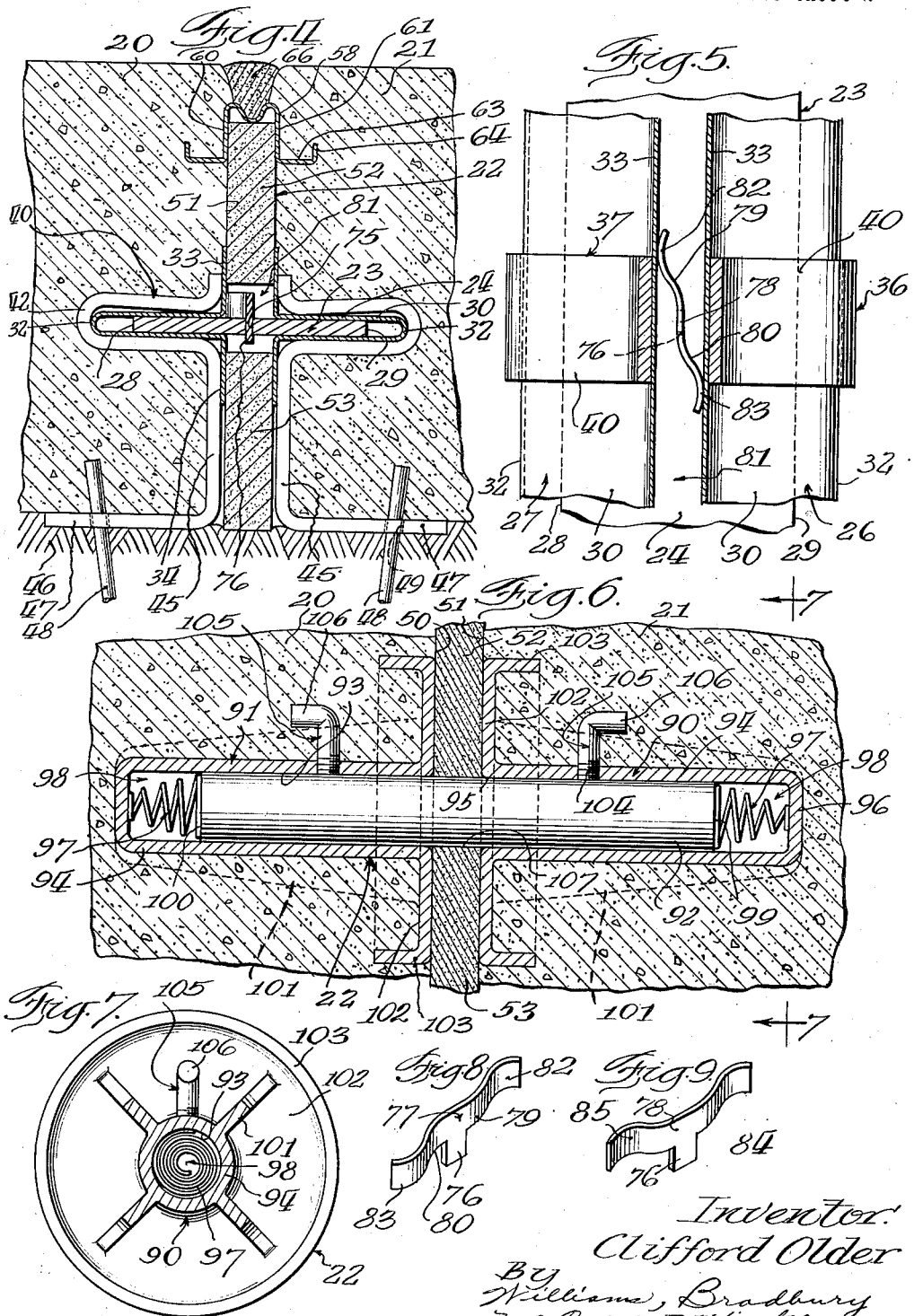
Inventor
Clifford Older
BY Williams, Bradbury
McCaleb & Hinkle
Attys Patented Aug. 27, 1940

2,212,615

UNITED STATES PATENT OFFICE 2,212,615

CONCRETE ROAD JOINT

Clifford Older, Wilmette, Ill.

Application October 20, 1939, Serial No. 300,319

7 Claims. (Cl. 94—18)

The present invention relates to concrete joints, and is particularly concerned with concrete road joints of the type having a load transmission member which is adapted to slide in adjacent concrete sections and transmit load from one section to the other across a crack between the sections.

The present invention is equally adaptable to the type of concrete road joints called expansion joints, which are arranged for initial expansion of the concrete, as well as contraction, and also adaptable for use in the type of joints called contraction joints, which are arranged for initial contraction, but not for initial expansion of the concrete in which the joint is installed.

One of the objects of the invention is the provision of an improved concrete expansion joint having a slidably mounted load transmission member which is of such construction that the sliding load transmission member is adapted to be maintained with its medial line at a point substantially midway between the ends of the concrete sections, for the purpose of utilizing the load transmission member most effectively, and effecting a saving in the width of a load transmission member of the plate type, or the length of the load transmission member of the dowel or bar type.

In the concrete expansion joints of the prior art, as exemplified in my prior patents, dowel plates have been slidably mounted in shields in both of the concrete sections, and the same is true for dowel bars or rods; but none of the devices of the prior art have any provision for making sure that the load transmission member is centered over the joint.

This may result in a large portion of the load transmission member being housed in one or the other of the shields or sockets of the concrete sections in which it is employed, and the effective part of such a load transmission member in the other section is, therefore, very limited in the amount in which it projects into the other concrete section.

In order to secure effective results under those conditions, it is necessary to make the dowel plate wider, or the dowel bar or rod longer and this, of course, increases the expense because the shields or socket members must be made of suitable size to take the longer dowel rod or bar or the wider dowel plate.

Another object of the invention is the provision of an improved concrete road joint having sliding load transmission means and suitable arrangements for centering the load transmission means so that it is in centered position at all times and so that the forces applied to the load transmission member will be balanced, or the load transmission member will be so employed that this member and its associated parts will be of equal strength in each concrete section.

Another object of the invention is the provision of improved concrete road joints of the class described which may be used for expansion joints or for contraction joints, and which are provided with resilient means for determining the position of the dowel plate or dowel bar, the resilient characteristics of which may be suitably predetermined so as to have sufficient force to accomplish the result of maintaining the load transmission member in a medial position with respect to the joint.

Another object of the invention is the provision of improved concrete road joints of the class described, which are simple, capable of economical manufacture, and adapted to be installed without the use of skilled labor, and without loss of time, and without trouble in the making of concrete roadways.

Other objects and advantges of the invention will be apparent from the following description and the accompanying drawings, in which similar characters of reference indicate similar parts throughout the several views.

Referring to the two sheets of drawings accompanying the specification,

Fig. 1 is a fragmentary vertical sectional view through a concrete roadway equipped with an expansion joint constructed according to the invention;

Fig. 2 is a fragmentary horizontal sectional view, taken on a plane coincident with the top of the dowel plate, showing the structure of the springs acting on the dowel plate;

Fig. 3 is a view similar to Fig. 1, showing a contraction joint;

Fig. 4 is a view similar to Fig. 1 of a modification;

Fig. 5 is a fragmentary sectional view, taken on a horizontal plane located just above the clamping members 40 of Fig. 4;

Fig. 6 is a fragmentary view similar to Fig. 1, showing another modification;

Fig. 7 is a sectional view, taken on the plane of the line 7—7 of Fig. 6, looking in the direction of the arrows;

Figs. 8 and 9 are perspective views of the springs which may be employed in Figs. 4 and 5.

Referring to Figs. 1 and 2, these are fragmentary sectional views of a portion of the concrete roadway in which an expansion joint has been installed according to the invention. The adjacent sections of the roadway have been indicated by the numerals 20, 21, and 22 indicates the expansion joint unit in its entirety.

The expansion joint unit preferably comprises a load transmission member or dowel plate 23, which may consist of a metal plate, having its upper and lower surfaces 24, 25 substantially parallel so that the plate is of uniform cross section in a transverse direction and adapted to be slidably mounted in a pair of socket or shield members, which are indicated by the numerals 26 and 27.

The metal plate 23 is preferably made of steel or other suitable material adapted to withstand the bending and shearing and other forces applied to it, and it may be constructed of steel, which is suitably treated, to avoid corrosion, or of stainless steel, if desired.

The dowel plate 23 is not only of uniform thickness, but is preferably of substantially uniform width between its edges 28 and 29, and it may extend all the way across the roadway, or may be in a plurality of long or short sections, the sections 23 being arranged with the sides 24 and 25 of each section having other of the transverse elements parallel to the elements of every other section, so as to assure sliding movement.

It will be evident to those skilled in the art that this does not call for parallelism between the upper and lower plane surfaces 24 and 25 of different sections of the dowel plate, but merely that all the sections of dowel plate shall be adapted to slide simultaneously in the socket or shield members 26, 27.

The shield members 26 and 27 are preferably made of sheet metal, and in the expansion joint of Fig. 1 may be identical in shape and construction so that only one type of shield need be manufactured. Each shield is preferably provided with an upper flange 30, a lower flange 31, a U-shaped bend 32 joining these flanges, and the upwardly and downwardly extending flanges 33, 34.

The shields 26 and 27 may be made of relatively stiff sheet metal, if desired, provided the socket 35 therein is adapted to have a close sliding fit with the dowel plate 23; but I prefer to make the shields of relatively flexible and bendable sheet metal, such as steel, so that tight engagement between the dowel plate 23 and each shield 26 or 27 may be accomplished by suitable clamping members 36, 37.

Each shield 26 and 27 has its upper and lower flanges 30 and 31 of sufficient width so as to receive substantially half of the width of the dowel plate 23, and in addition, to provide space for a spring 38 in its fully contracted position. In other words, there is a recess 39 between the edge 29 of the dowel plate 23 and the U-shaped bend 32, to provide space into which a dowel plate 23 may slide as the concrete expands in an expansion joint.

The clamping members 36 may be of various types, as exemplified in my prior patents; but I prefer to provide a clamping member of substantially U shape, made of relatively stiff metal, such as a bar of steel or iron, having a pair of upper and lower clamping portions 40, 41.

The clamping members on opposite sides may be identical in construction, and for clarity, the one at the left will be described in detail.

The upper and lower clamping portions 40 are joined by a U-shaped bend 42, and the clamping portions may consist of straight or curved parts of the bar, but they are provided with an initial deformation, which renders the portions 40 and 41 closer together than the thickness of the shield and dowel plate assembly to which they are attached. Also, they are preferably arranged to engage the shield 27 at predetermined points, such as 43, at the top, and over the length of the portion 41 at the bottom, as it is easier to manufacture a clamping member which will effect a suitable clamping action in this manner than it is to try to make one which is an accurate parallel fit on the shield 27.

Each upper portion 40 preferably has an upwardly turned end 44 arranged to engage the vertical flange 33 on the shield 27, and a downwardly extending leg or column 45 arranged to engage the downwardly extending flange 34, and to support and secure the joint unit in its proper position for pouring of the concrete.

The clamping portions 40 and 41 are, of course, long enough so that the U-shaped bend 42 is located outside the U-shaped bend 32 of the shield when the upward and downward portions 44, 45 engage the flanges 33, 34.

The leg or column 45 may continue down to the sub-grade 46, and may have a laterally turned foot 47 or stable supporting portion, which may be secured with sub-grade by a metal or wooden stake 48 driven through an aperture 49.

In order to provide for the initial expansion of the concrete sections 20, 21, which would occupy the space between the adjacent faces 50 and 51 of these sections, the joint unit is preferably provided with a means for forming an expansion space between these faces 50 and 51. This may consist of a crushable filler member 52, such as a strip of "Celotex" or other crushable material, or a crushable air chamber, which may be indicated by the outlines of the block 52.

As the dowel plate 23 extends across the crack between the faces 50, 51, another similar crushable member 53 is provided below the dowel plate. The dowel plate 23 is preferably located substantially midway between the top and bottom of the concrete sections 20, 21, or slightly below this line, in order to utilize fully the strength of the concrete above and below the shields to resist against splitting or other breaking forces; but it should be understood that the location of the dowel plate may be varied to suit the needs of the construction.

In the embodiment selected, it is slightly below the middle line, between the top and bottom of the concrete.

The spring 38 is identical in construction with another spring 38 at the other edge 28 of the dowel plate 23, and it is shown in greater detail in Fig. 2. It may consist of a wire of resilient material, such as steel, which is provided with wavy formations 54, 55, 56, 57, etc., alternately extending in opposite directions somewhat after the manner of a sine wave, as illustrated in Fig. 2.

It should be understood that the exact shape of the bends in the spring may be varied, and the stiffness of the spring, as desired, may be varied by increasing or decreasing the number of bends, or by increasing or decreasing the thickness of the wire. Of course, an increase in the thickness of the wire will make the spring stiffer, and an increase in the number of bends will result in a stiffer action, as the long bend in a wire of given thickness is more easily deformed than a short one.

The springs 38 are preferably identical in strength and construction, or as nearly so as can be secured by ordinary manufacturing methods, with the result that each spring acts equally upon the edges 28, 29 of the dowel plate 23. The springs react against the inside of the U-shaped bends 32, which tend to center the spring, and the springs tend to center the dowel plate 23 midway of the joint member.

Thus each edge of the dowel plate 23 projects an equal amount into the concrete of each section 20, 21 at all times, and the steel of the dowel plate is utilized most effectively at all times. The width of the steel dowel plate may be cut down over that necessary in the devices of the prior art, to assure adequate strength in the parts of the dowel plate which project into both sections.

The crushable member 52 preferably supports a suitable flexible shield 58 of copper or other bendable and non-corrodible sheet metal, which has a centrally expansible portion 59, a pair of parallel vertical flanges 60, 61, and a pair of laterally projecting flanges 62, 63, with upwardly turned or other anchoring formations 64.

The parallel flanges 60, 61 may fit on the crushable member 52, in order to assure the proper support of the seal 58. The adjacent upper edges 65 of the concrete section may be rounded off, and the space above the seal between these edges may be filled with an initially plastic crack filler 66, such as an asphalt compound, to protect the corners against breakage by the traffic, and keep this space from filling with material which might damage the seal or the adjacent edges of the concrete sections.

Referring to Fig. 3, this is similar, showing a contraction joint adapted for initial contraction of the concrete sections, but not adapted for initial expansion. In this embodiment the clamping members may be of similar construction, and the shields may be similar, except that the shield 67 has its upwardly extending flange 68 and its downwardly extending flange 69 of sufficient width to serve as a division plate, whereas the shield 70 need not have upwardly and downwardly extending flanges 33, 34, as shown in Fig. 1.

The flanges 33 and 34 in Fig. 1 are adapted to engage and support the crushable fillers 52, 53, which are also omitted from a contraction joint in Fig. 3. The flexible copper seal 71 may have its parallel vertical flanges 72, 73 joined by a partially cylindrical bead 74, and the flanges 72, 73 are close enough together to effect a clamping action on the division plate 68, 69.

The dowel plate 23 is of similar construction to that previously described, and the shields 67 and 70 house springs 38 of similar construction for maintaining the dowel plate 23 in a central position.

Referring to Figs. 4 and 5, this is a modification of an expansion joint similar to Fig. 1, in which all of the details of construction are similar to that described with respect to Fig. 1, except the springs, which are not housed in the shield, but are housed between the ends 50 and 51 of the concrete sections 20, 21 and below the crushable member 52, and above the crushable member 53.

In this embodiment the dowel plate 23 is provided with a plurality of slots or apertures 75 located midway between the edges 28, 29 of the dowel plate and adapted to receive one or more downwardly extending lugs 76 carried by specially shaped spring members 77.

The springs may be of the type shown in Fig. 5, where each spring has a central body 78 which supports the downwardly extending lug 76, and each spring is provided with the lateral bends 79 and 80, extending in opposite directions toward opposite sides of the expansion space 81.

The ends of the springs may be curved backward at 82 and 83, where they engage the vertical flanges 33 of the oppositely disposed shields.

In the embodiment of Fig. 5, supporting lug 76 is thus subjected to a torsion when pressure is exerted against the ends of the springs 82, 83 by the shield flanges 33. In other embodiments of the invention a spring of the type shown in Fig. 9 may be used. This spring 84 has a similar lug 76, but the resilient portions 85 are both bent in the same direction, to engage the same flange 33.

When springs of the type 84 are employed, they are alternately disposed in opposite directions, to engage the flanges 33 on opposite sides alternately, or two springs 84 may have their lugs 76 disposed back to back in the same aperture 75. Any number of the springs 77 or 84 may be employed, and they are preferably symmetrically arranged and equally spaced longitudinally of the joint for the purpose of assuring the central location of the dowel plate 23.

With respect to the embodiments so far described, the springs 38, 77, or 84 employed are preferably provided with an initial compression when the joint is assembled; that is, the springs are already compressed when they are housed in the shields 26, 27, as shown in Figs. 1, 3, or 4, and the springs already engage the dowel plate 23, and urge it to a central position.

As the springs act with equal and opposite force in Fig. 1 or 3, or in Fig. 4, the dowel plate is maintained in centered position. Naturally there is a tendency for the springs to force the shields 26 and 27 off the dowel plate, but this is to be resisted by the clamping members 36 and 37, which clamp with sufficient force and apply sufficient friction to the inner faces of the shield flanges 30 and 31, against the dowel plate 23, so that the clamping members hold the shields on the dowel plate in the position of Figs. 1, 3, or 4, against the action of the springs.

I have found by experience that this friction diminishes after the joint has once expanded and movement has taken place between the dowel plate and its shields or sockets, and thereafter the dowel plate is adapted to move quite easily so that it may be acted upon and centered by springs which are not of very great strength.

Referring to Fig. 6, in this embodiment the concrete sections 20 and 21 are joined by a dowel member 92, which is shown as being cylindrical in shape. The dowel member may, however, be of any suitable geometrical shape and cross section, because it is uniform in cross section throughout its length, so that it may be slidably mounted in the socket members 90, 91.

The dowel member 92 in this case may consist of a steel rod or bar, and the socket members 90, 91 may be made of cast metal, such as steel or iron, each socket member being provided with an internal bore 93, which is machined to a close sliding fit with the dowel rod 92.

The socket members 90, 91 are identical in shape, but oppositely disposed, and therefore only one need be described. Each consists of a tubular body portion 94, having an open end at 95 and a closed end at 96. The tubular body portion is sufficiently longer than one-half of the length of the dowel rod 92, so that the spring 97 may still be housed in the space 98 when it is fully contracted.

The spring 97 may consist of a helical coil spring, but is preferably made spiral, as shown, so as to occupy less space when it is fully compressed, the coils falling within each other and forming a substantially flat spring at that time. One end of the spring reacts against the end 96 of the socket, and the other reacts against the end 99 or 100 of the dowel bar 92.

The socket members 90, 91 are also preferably formed with radially extending flanges 101, equally spaced about its periphery and extending longitudinally of the body 94.

The radially extending flanges 101 may be tapered toward the end 96 of the socket member 90, and may be joined at their opposite end to a face flange 102. The face flange 102 may be provided with an inwardly extending flange 103 of cylindrical form in Fig. 7, but the inwardly extending flange 103 may be of any desired shape or pattern.

Each body 94 is provided with a threaded bore 104 extending through the wall of the tubular portion 94, and adapted to receive the threaded end of a set screw or bolt 105, which in Fig. 6 has a laterally turned end 106. The set screw 105 places sufficient friction between its end and the dowel rod 92 so that both of the socket members 90, 91 may be clamped on the dowel rod 92 by the set screws 105.

This is done with an initial compression on the spring 97 at each end.

The filler members 52, 53 may be similar to that shown in Fig. 1, and the joint may be provided with a flexible seal, as shown in Fig. 1, and finished at the top as shown therein.

In this embodiment the filler members 52 and 53 consist of one integral piece, which has a plurality of holes 107 for passing the dowel rods, and the joint transmission assembly, comprising the dowel rods 92 and sockets 90, 91, are supported on the filler 52, 53.

It will thus be observed that I have invented an improved concrete road joint, which may be embodied either in expansion or contraction joints, having dowel plates for load transmission or dowel rods or bars.

My road joint unit may be installed as a unit, and it is adapted to make the most efficient use of the metal dowel plate because the spring devices included in the assembly maintain the dowel plate in a central position and prevent it from being driven to one side or the other.

The springs, being provided with an initial compression, are placed in position to act once on the dowel plate, and the friction, which holds the shield or socket members on the dowel plate, may be adjusted so that it is only a little more than enough to resist the initial thrust of the springs. The forces acting on the ends of the concrete sections, by virtue of the load, transmitted from one section to the other through the dowel plate, are equalized and balanced, and each side of the joint is as strong as the other. The crimped springs, which are utilized to engage the edge of the dowel plate, may be manufactured at a very low cost, and add but little to the total cost of the joint; but they serve to reduce the width of the dowel plate, which is necessary to secure a load transmission construction of maximum strength.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a contraction joint, the combination of a pair of concrete sections with a joint unit, comprising a dowel plate adapted to be slidably mounted in said concrete sections, said dowel plate having each of its edges provided with a metal shield for slidably engaging the edges of said dowel plate and forming an expansion space in each shield for the edges of said dowel plate, means for forming a crack at a predetermined point of said concrete sections, and resilient means reacting against each of said concrete sections and acting on said dowel plate for centering said dowel plate with respect to the crack between said sections, said resilient means comprising a spring housed in each of said shields and engaging the edge of said dowel plate, and said spring being formed with a plurality of oppositely extending resilient portions engaging the edge of the dowel plate and the end of the socket in said shield.

2. In a concrete road joint, the combination of a pair of concrete sections located adjacent each other and having a crack between said sections, a dowel plate being slidably mounted with respect to both of said sections, and housing means carried by the edges of said dowel plate for forming an expansion space in each concrete section at each edge of the dowel plate, and resilient means reacting against each of said sections and acting on said dowel plate for maintaining said dowel plate in centered position with respect to said crack, said resilient means being housed in the housing at each edge of said dowel plate, and comprising a resilient metal wire of crimped form, having oppositely extending portions engaging the end of said housing and the edge of said dowel plate.

3. In a concrete road joint load transmission member, the combination of a dowel member of uniform cross section, with a pair of socket members adapted to be slidably mounted on said dowel member, friction means carried by each socket member for engaging the dowel member and holding the socket member on the dowel member, and resilient means housed in each socket member and engaging said dowel member for maintaining the dowel member in centered position with respect to the joint.

4. In a concrete road joint load transmission member, the combination of a dowel member of uniform cross section, with a pair of socket members adapted to be slidably mounted on said dowel member, friction means carried by each socket member for engaging the dowel member and holding the socket member on the dowel member, and resilient means housed in each socket member and engaging said dowel member for maintaining the dowel member in centered position with respect to the joint, said dowel member comprising a rod of substantially uniform cross section, and said socket members comprising a plurality of separate units, two of said units being mounted on each dowel rod.

5. In a concrete road joint load transmission member, the combination of a dowel member of uniform cross section, with a pair of socket members adapted to be slidably mounted on said dowel member, friction means carried by each socket member for engaging the dowel member and holding the socket member on the dowel member, and resilient means housed in each socket member and engaging said dowel member for maintaining the dowel member in centered position with respect to the joint, said dowel member comprising a rod of substantially uniform cross section, and said socket members comprising a plurality of separate units, two of said units being mounted on each dowel rod, and said spring means comprising a spiral coil spring located in each socket.

6. In a concrete road joint, the combination of a pair of adjacent concrete sections having a crack between said sections, with a dowel plate slidably mounted in each of said sections, and housing means in each of said sections for forming a socket into which the dowel plate may slide, means for forming an expansion space between the ends of said sections, and resilient means reacting against a part carried by each of said sections, and acting on said dowel plate to maintain said dowel plate in centered position with respect to the crack between said sections, said resilient means comprising a spring housed in said expansion space between the ends of said sections.

7. In a concrete road joint, the combination of a pair of adjacent concrete sections having a crack between said sections, with a dowel plate slidably mounted in each of said sections, and housing means in each of said sections for forming a socket into which the dowel plate may slide, means for forming an expansion space between the ends of said sections, and resilient means reacting against a part carried by each of said sections, and acting on said dowel plate to maintain said dowel plate in centered position with respect to the crack between said sections, said resilient means comprising spring means carried by said dowel plate and engaging a part carried by the ends of said concrete sections in said expansion space.

CLIFFORD OLDER.